April 16, 1935. H. I. WATERMAN 1,998,212
PROCESS FOR THE MANUFACTURE OF VALUABLE PRODUCTS FROM CARBONACEOUS MATERIALS
Filed Dec. 1, 1930
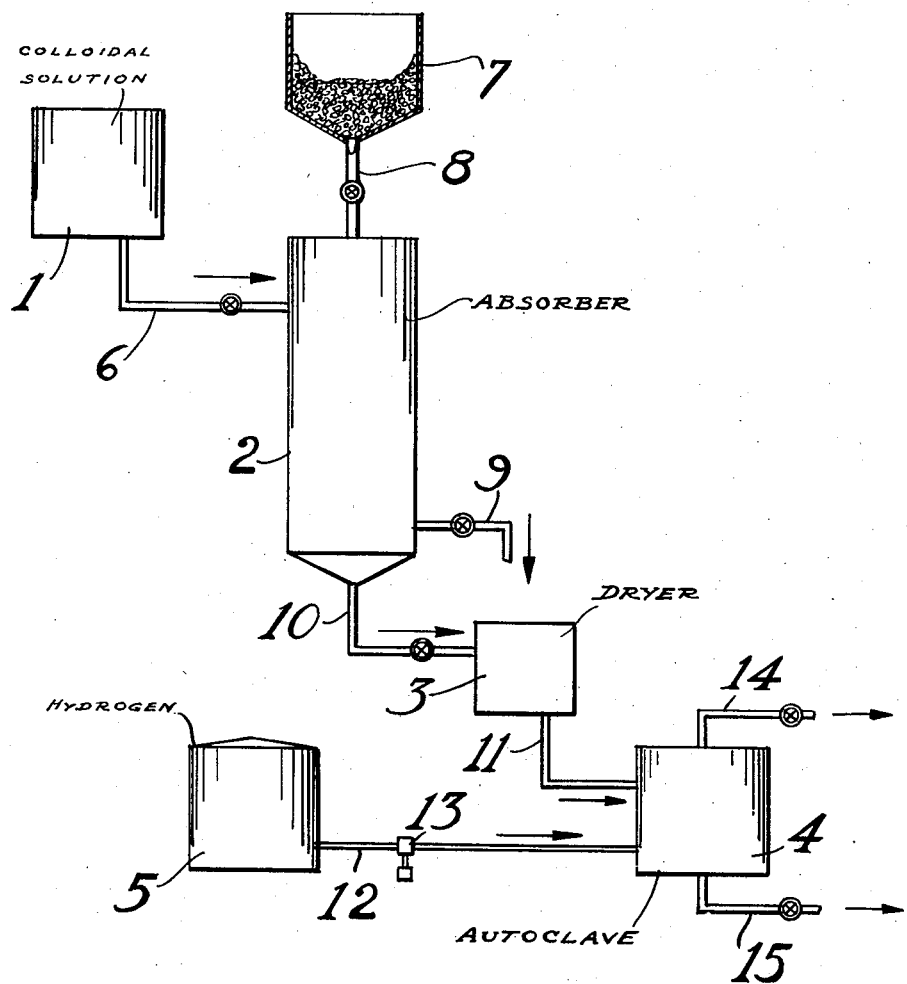

UNITED STATES PATENT OFFICE 1,998,212

PROCESS FOR THE MANUFACTURE OF VALUABLE PRODUCTS FROM CARBONACEOUS MATERIALS

Hein Israel Waterman, Delft, Netherlands, assignor, by mesne assignments, to Shell Development Company, San Francisco, Calif., a corporation of Delaware Application December 1, 1930, Serial No. 499,414
In Great Britain December 6, 1929

1 Claim. (Cl. 196—53)

It has been proposed to treat carbonaceous materials, such as coal, mineral oils, tars and the like with hydrogen or hydrogen-containing gases or gases or substances which yield hydrogen under the conditions of the reaction at elevated temperature and pressure in the presence of catalysts, which consist of masses comprising finely divided absorption substances such as decolourizing carbon or other absorption materials intimately mixed with finely divided molybdenum compounds.

Preferably said catalytic masses are prepared by absorbing or mixing molybdenum compounds in a colloidal state, for instance a colloidal solution of said compounds with absorption carbon or finely divided coal such as brown coal.

I have now found according to this invention that various other metals or metal compounds, which according to the literature, act as catalysts of the above mentioned reaction, may be brought in the same way into an extremely active form, whereby their catalytic influence is rendered much greater than is the case when they are applied in their usual form.

Thus for example compounds of chromium, tungsten, uranium, manganese, cobalt, nickel or iron, for example iron oxide or Prussian blue, and of the metals of the first to the fifth group of the periodic system which in many cases have only a small catalytic effect on the above reaction, may be greatly improved in this respect when they are applied in a state which is obtained by the above specified method.

Also mixtures of or mixtures containing these compounds, for instance mixtures of compounds of chromium and molybdenum or compounds of tungsten and molybdenum in the above mentioned special form, may be used according to the invention.

The nature of the invention and the manner in which it is carried out will be fully understood from the following description read with reference to the accompanying drawing which is a diagrammatic view in sectional elevation of a type of apparatus suitable for the purpose. In the drawing numeral 1 designates a supply tank of colloidal solution of Prussian blue. Numeral 2 designates an absorber, numeral 3 a drier, numeral 4 an autoclave, and numeral 5 a supply tank of hydrogen or gas containing the same. The colloidal solution is withdrawn from tank 1, through valved line 6, and introduced into the absorber 2. When the absorber 2 is nearly full of solution the flow is shut off and coal or other material to be treated contained in hopper 7 is introduced into the absorber through line 8. When absorption of the Prussian blue is substantially complete the solution is withdrawn from absorber 2 through line 9. Thereafter the coal containing absorbed colloidal Prussian blue is withdrawn from absorber 2 through line 10 and introduced into the drier 3. When drying is complete the dry material is withdrawn through line 11 and introduced into the autoclave 4. Hydrogen is withdrawn from tank 5 through line 12 by means of pump 13 and forced into autoclave 4 under a pressure of about 100 kilograms per square centimeter. The autoclave is then heated gradually to a temperature above 400° C. and when this temperature is reached the heating is stopped and vaporous reaction products are withdrawn through line 14 at a temperature somewhat below 400° C. The residue is withdrawn through line 15.

It will be understood that the coal or other initial material to be treated may be introduced into the absorber either in the dry state or in the form of a suspension in heavy oil or other suitable vehicle.

The following comparative examples illustrate the process and advantages of the invention:

1(a). 4.22 grams of potassium ferrocyanide are dissolved in 1 litre of water and thereafter the solution is treated with a solution containing less than the theoretical quantity of ferric chloride required to combine with the ferrocyanide. In this way a colloidal solution of Prussian blue is obtained, to which a suspension of 215 grams of Carisborg brown coal is then added. The liquid is almost entirely decolourized, assuming a pale green colour. After separating the solid mass, the same is dried and 210 grams thereof containing 167.4 grams of coal calculated on an ash and moisture-free basis, and 3.6 grams of Prussian blue incorporated therewith, are brought into an autoclave. In 55 minutes the autoclave is gradually heated from room temperature to 461° C. at an initial pressure of 100 kg./cm$^2$. Immediately after said temperature has been reached, heating is stopped and at a temperature of about 390° C. those portions of the reaction products which at said temperature are in a gaseous state are withdrawn.

The yield of reaction products calculated on an ash and moisture-free coal is as follows:—

12.4% of water, 29.0% of gas, 2.2% of liquid hydrocarbons boiling up to 220° C., 5.5% of liquid hydrocarbons boiling from 220° C. to 300° C., 4.2% of substances of a cresolic nature boiling up to 300° C., 31.7% of high boiling tar or asphaltic residue and 14.6% of coal-like residue. Thus 43.6 per cent of the pure coal was liquefied.

1(b). In order to compare the results of the above the following comparative examples carried out under exactly the same conditions except that the catalyst was obtained by preparing a precipitation of Prussian blue and thoroughly mixing the same with the brown coal gave the following results:

The yield of reaction products obtained was as follows: 10.3% of water, 26.8% of gas, 2.1% of liquid hydrocarbons boiling up to 220° C., 4.4% of liquid hydrocarbons boiling from 220° C. to 300° C., 3.0% of substances of a cresolic nature boiling up to 300° C., 12.0% of high boiling tar or asphaltic residue and 40.2% of coal-like residue. Thus only 21.5% of the pure coal was liquefied.

2(a). 8.8 grams of commercial ferric chloride are dissolved in 6 litres of water; ammonium carbonate is then added in a quantity just insufficient to form a permanent precipitate. The colloidal solution of iron hydroxide prepared in this way is mixed with 204 grams of powdered Carlsborg brown coal. Thereafter the mass is filtered and dried. In this way there is obtained 197.4 grams of a mass consisting of 194.7 grams of dry brown coal containing 18.0 grams of ash and a quantity of iron oxide equivalent to 2.7 grams $Fe_2O_3$. This mass is introduced into an autoclave and heated under an initial pressure of 100 kg./cm$^2$ in the presence of hydrogen. In 56 minutes the temperature of the mass is gradually raised to 460° C. Immediately thereafter heating is stopped and when the temperature in the autoclave has fallen to 380° C. a separation of high-boiling residual products and lower-boiling products including non-condensible gases and water which has been formed during the reaction, is effected by withdrawing from the autoclave that part of the reaction products which at the aforesaid temperature is in a gaseous state. The products withdrawn are cooled in order to obtain valuable liquid products therefrom. The products obtained contain 12.5% of water, 27.7% of gas, 5.3% of a benzine-like liquid boiling below 220° C., 5.9% of a kerosene-like liquid boiling between 220° C. and 300° C., and 4.2% of cresolic substances boiling below 300° C., while the residue contains 35.4% of a valuable hard asphaltic substance and 9.0% of coal-like substances calculated as percentages of dry and ash-free brown coal.

2(b). In order to show that the favourable results of the above example are due to the active form of the catalyst, the following comparative example is given:

204 grams of brown coal are carefully and intimately mixed with 3.1 grams of a precipitate of iron hydroxide containing 0.3 gram of moisture and 2.8 grams of dry substance, and the mixture thereafter treated under substantially similar conditions as those described in Example 1.

As a result of this treatment 10.9% of water, 29.1% of gas, 2.3% of a benzine-like liquid boiling below 220° C., 3.8% of a kerosene-like liquid boiling between 220° C. and 300° C., 5.3% of cresolic substances, 24.9% of asphaltic residue and 23.8% coal-like substances, calculated as percentages of dry and ash-free brown coal are obtained.

Thus, according to Example 2(a) 50.8% of the coal is converted into valuable oily matter, whereas according to Example 2(b) only 36.3% of oily matter is obtained.

3. 15 grams of $CrO_3$ are dissolved in 1 litre of water and treated with hydrogen sulphide at 60° C. A brown colloidal solution, which probably contains mainly $CrO_2$, is obtained, to which Norit, a decolorizing carbon, is added. The colloidal chromium compound is adsorbed by the active carbon and the latter separated from the solution and dried at a temperature of 100–110° C. 99.8 grams of a lubricating oil containing 1.92% sulphur are heated with 25.0 grams of the catalytic mass thus obtained, which contains about 4.5 grams of chromium oxide (reckoned as $Cr_2O_3$). The initial pressure of the hydrogen amounts to 100 kilos/cm$^2$. The temperature is raised in 48 minutes from room temperature to 460° C., whereafter heating is stopped and the gaseous part of the product withdrawn from the reaction vessel by release of pressure while the mass is still at a high temperature. In the autoclave there remains 63.0% of a practically colorless lubricating oil, containing 0.38% S. Moreover, 26.9% of a distillate is obtained containing 0.21% of sulphur, whilst 10.1% of gas is formed. In all about 85% of the sulphur is removed from the original lubricating oil.

4. 99.5 grams of the lubricating oil is used in Example 3 are heated with a mixture of 4.0 grams of a catalytic mass comprising active carbon on which 1.0 gram colloidal molybdenum oxide (reckoned as $MoO_3$) has been adsorbed and 6.0 grams of a catalytic mass comprising active carbon on which 1.0 grams of colloidal chromium oxide (reckoned as $Cr_2O_3$) has been adsorbed in the manner described in Example 3. The initial pressure of the hydrogen amounts to 100 kilos/cm$^2$ and the mass is heated in 38 minutes from room temperature to 456° C. Thereafter heating is stopped and the gaseous part of the products withdrawn from the reaction vessel by release of pressure, while the mass is still at a high temperature. The products are: gases 7.2%, light yellow autoclave distillate 17.3% (S-content 0.40%), lubricating oil remaining in the autoclave 75.5% (S-content 0.27%). In all about 86% of the sulphur is removed from the original lubricating oil.

5. 100 grams of cresol were heated with 10.7 grams of colloidal rhenium sulphide precipitated on active carbon.

The catalyst was obtained by dissolving 1.1 grams of $KReO_4$ in 1.1 litres of water, acidifying the solution with 5 c. cs. of 4 normal $H_2SO_4$, heating the solution up to 80° C., and treating the hot solution, to obtain the rhenium sulphide, with $H_2S$ until the solution assumed a dark brown color. 10 grams of active carbon were then added, which absorbed the rhenium compound.

Under an initial hydrogen pressure of 100 kg./cm$^2$ the reaction mass of cresol and catalyst was heated to 450° C. during 40 minutes, whereupon heating was stopped. The gaseous part of the reaction mass was withdrawn by release of pressure, while the temperature of the mass was still between 320–250° C.

As a result of the reaction 8.3% of water, 41.4% of gasoline (final boiling point 220° C. and substantially boiling below 110° C.), 35.0% cresols (final boiling point 220°), 10.8% of cresol-containing residue were obtained and gases and losses included amounted to 4.5%. If desired, part of the 10.7 grams colloidal rhenium sulphide precipitated on the active carbon may be substituted by colloidal molybdenum oxide precipitated on active carbon, in which event also very favorable results will be obtained.

It is to be understood that the invention is not restricted to the use of Prussian blue and iron oxide prepared as described in the above examples, but that it comprises the use of a catalyst for carrying out the aforesaid processes of all catalytic masses prepared by bringing Prussian blue or iron oxide in a finely divided state on to finely divided absorption substances such as decolourizing carbon or other absorption materials.

It will also be understood that it is not necessary that the whole quantity of the brown coal or other carbonaceous material to be converted should be contacted with the catalyst as described in the examples. It is also possible to treat a quantity of brown coal with the catalyst and then to mix this quantity with the total mass of the carbonaceous material to be treated.

The catalysts mentioned above may in the first place be used advantageously when treating solid carbonaceous materials such as coal, brown coal, lignite, cellulose and the like substances as indicated above; furthermore they may be used when treating other carbonaceous materials such as asphalts, tars, mineral oils and distillation or extraction products obtained therefrom.

The catalysts according to the invention may advantageously be employed in all processes wherein carbonaceous materials of the nature specified above are treated in the presence of hydrogen or gases which have an analogous action such as carbon monoxide, at elevated temperature and pressure, independent of the reacting conditions under which the process is performed; thus for instance the invention comprises processes known as destructive hydrogenation, and also the treatment of various oxygen-containing organic materials such as phenols, cresols and the like for the purpose of converting the oxygen compounds into valuable hydrocarbons substantially without splitting of the oxygen-containing molecules. Also the catalysts according to the invention may be used for treating various materials with hydrogen under pressure and elevated temperature for the purpose of converting same into refined products whereby cracking of the molecules is avoided as much as possible.

Various sulphur compounds which may be present in the initial materials, are converted into products free from sulphur by such a process.

What I claim is:

An improved process for liquefying solid carbonaceous substances of the class of coal, brown coal, lignite and the like which comprises adsorbing Prussian blue from a colloidal solution thereof on the solid substance to be hydrogenated, and then subjecting such substance to the action of free hydrogen under temperature and pressure conditions suitable for destructive hydrogenation.

HEIN ISRAEL WATERMAN.